May 26, 1953 F. VON SZILAGYI 2,639,760
ADJUSTABLE RESILIENT SHOCK ABSORBING
SUPPORT FOR VEHICLE SADDLES
Filed Feb. 17, 1950
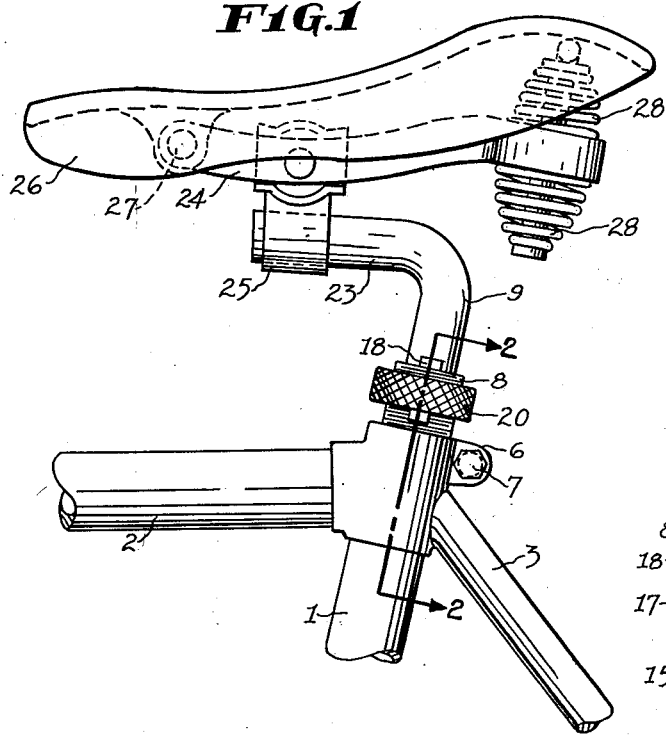
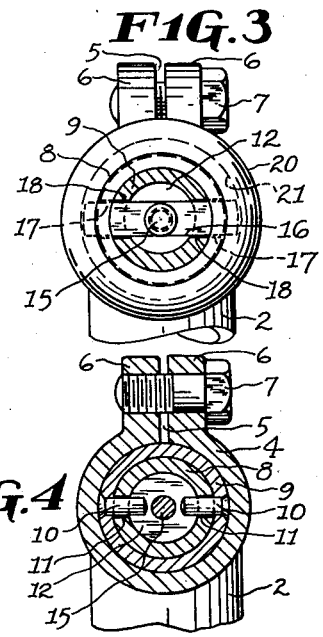
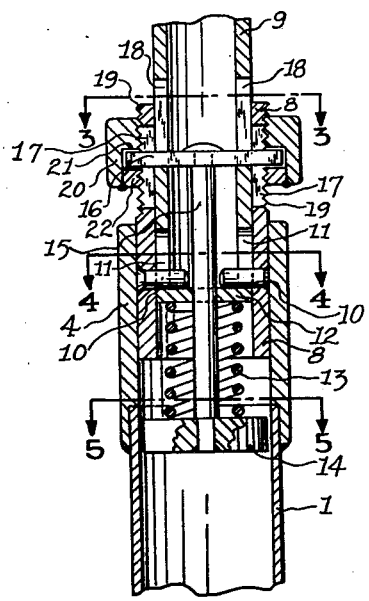
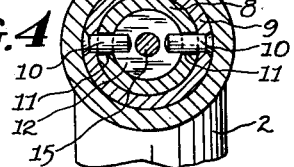
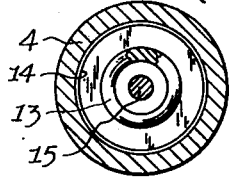
Inventor
Franz Von Szilagyi.
By Gehr & Leonard,
his Attorneys.

Patented May 26, 1953

2,639,760

UNITED STATES PATENT OFFICE 2,639,760

ADJUSTABLE RESILIENT SHOCK ABSORBING SUPPORT FOR VEHICLE SADDLES

Franz von Szilágyi, Bruck a. d. Leitha, Austria, assignor to George Klammer, as trustee, Olmsted Falls, Ohio Application February 17, 1950, Serial No. 144,610
In Austria April 29, 1949

7 Claims. (Cl. 155—5.19)

This invention relates to a resilient shock absorbing support for saddles of bicycles, motorcycles and the like and particularly to a shock absorbing supporting device which may be mounted by the conventional securing means in the usual generally upright tubular frame member of the vehicle frame so as to resiliently support the saddle and which is provided with means readily accessible from the exterior of the support and frame member by which the device can be easily adjusted manually in relation to the weight of the rider of the vehicle so as to absorb vibrations, shocks and the like effectively regardless of the weight of the rider and regardless of the condition of the road surface.

More particularly, in the illustrative embodiment, the saddle support comprises a carrier sleeve which is adapted to be secured in generally upright position in the usual seat post receiving frame member or socket of a bicycle frame, a saddle supporting sleeve or post telescopically interfitting with the carrier sleeve for movement endwise thereof while constrained from rotation relative thereto, a spring or other resilient means operatively interposed between the sleeves and located within the frame member when the device is installed and normally urging the saddle supporting sleeve upwardly, and manually operable means on the exterior of one of the sleeves for adjusting the spring, the last named means being arranged so that it can be grasped in the hand and operated for adjustment of the spring while the operator of the vehicle is seated on the saddle.

Prior supports for bicycle and motorcycle saddles comprise a rigid sleeve or post which is detachably received in a generally upright socket provided by the upper end of an upright member of the frame and reinforced by a connecting collar or fitting which connects the upright member with the other frame members. The saddle is detachably secured to a generally horizontal forwardly extending upper end portion of the post by a suitable detachable connecting frame and springs are operatively interposed directly between the connecting frame and the saddle. Such structures operate satisfactorily only for riders of certain weights because the operating characteristics of the spring are limited to a relatively narrow range to produce the best results for a rider of average weight for the particular size of bicycle. If a much lighter rider is seated on the saddle, the springs, having been designed for a heavier person, are too stiff to absorb the shocks effectively and instead transmit them to the rider. If an extremely heavy person is riding, then the springs often are stressed to such a degree that little resiliency or length of travel is left for absorbing ordinary shocks and frequently, under heavy shocks, the saddle strikes directly against rigid parts of the structure.

The object of the present invention is to provide a resilient shock absorbing support in addition to the spring suspension provided on the saddle and which can be adjusted to compensate for the difference in weights of the riders so that shocks and vibrations resulting from operation of the vehicle are absorbed more effectively regardless of the rider's weight, whereby the rider and the bicycle are relieved therefrom.

Another object is to provide such a support in which the resistance of the resilient means can be adjusted readily so as to absorb light vibrations produced by numerous closely spaced minor irregularities on the road surface, or heavy shocks resulting from larger irregularities on the road surface, or shocks and vibrations due to various intermediate road conditions, respectively, regardless of the weight of the rider, thus enhancing riding comfort and relieving the bicycle from excessive vibrations and stresses which would otherwise occur.

Another object is to provide a shock absorbing support for the saddle which can be readily interchanged with the usual saddle supporting post and therefore is adapted for use on any of the conventional bicycles or motorcycles without requiring any changes in the structure of the bicycles or motorcycles.

Other objects and advantages will become apparent from the following description, wherein reference is made to the drawings, in which:

Fig. 1 is a fragmentary side elevation of a bicycle frame and saddle with the resilient shock absorbing support of the present invention installed;

Fig. 2 is an enlarged fragmentary axial sectional view of the saddle supporting and part of the bicycle frame in which it is installed and is taken on line 2—2 in Fig. 1; and, Figs. 3, 4, and 5 are cross sectional views taken on the lines 3—3, 4—4, and 5—5, respectively, of Fig. 2.

For the purpose of illustration, the saddle support of the present invention is described as used on a bicycle, its use with motorcycles and other vehicles being apparent from the illustrative example.

Referring to the drawings, the upper rear portion of a bicycle frame is illustrated and comprises a generally upright tubular frame member 1 to which are connected the usual horizontal tubular bar 2 and the rearwardly depending tubular frame member 3 to which the rear wheel fork is attached. For convenience in joining the frame members 2 and 3 to the upright tubular member 1, the usual reinforcing collar fitting 4 is provided. The collar 4 is usually welded to the frame members and forms an upward continuation of the frame member 1, the collar and member 1 together thus forming a receiving socket in which the standard saddle supporting post is telescopically received for vertical adjustment. The collar 4 is slit lengthwise at the rear, as indicated at 5, and is provided with the usual pads or ears 6 through which a bolt 7 is received for clamping the collar 4 tightly about the usual saddle supporting post or sleeve. Variations in the structure described may be made as they form no part of the present invention, such structures being well known in the art.

The resilient shock absorbing support of the present invention comprises essentially a carrier sleeve 8 which is telescopically received in the socket, provided by the collar 4 and upper end of the frame member 1, in the same manner as the usual rigid saddle supporting post or sleeve. The sleeve 8 may be clamped in the socket in generally upright adjusted position by means of the bolt 7 so as to form, in effect, a portion of the socket. The use of a separate sleeve 8 instead of an integral part of the socket is preferred for reasons of assembly, marketing, and adjustability for saddle height.

Telescopically interfitted with the carrier sleeve 8 is a saddle supporting sleeve or post 9. In the form illustrated, the saddle supporting sleeve or post 9 is telescopically fitted within the sleeve 8 for sliding movement endwise thereof. Suitable means such as pins 10 operatively interconnect the sleeves 8 and 9 to constrain the sleeves 8 and 9 from relative rotation about their common axis and to prevent movement of the sleeve 9 upwardly of the sleeve 8 beyond a predetermined position. In the form illustrated the pins 10 are secured to the sleeve 8 and extend through suitable longitudinal slots 11 in the sleeve 9.

The sleeve 9 has a suitable abutment, such as a bottom wall 12 which forms also the lower end walls of the slots 11 and is arranged to engage the under side of the pins 10 and thereby limit the outward movement of the sleeve 9 and prevent separation of the sleeves endwise.

Operatively interposed between the carrier sleeve 8 and the saddle supporting sleeve 9 is a resilient element such as a spring 13 which is arranged to resiliently urge the sleeve 9 outwardly of the sleeve 8 to the fully extended position in which the pins 10 engage the wall 12. In the form illustrated, the spring 13 is a compression spring.

Connected to the sleeve 8 through means later to be described is a connecting element 14 which is operatively connected to one end of the spring 13. The wall 12 provides a connecting element for operatively connecting the other end of the spring to the sleeve 9. Since a compression spring is shown in the illustrative embodiment, the connections with the spring are provided by the wall 12 and the element 14 which are in the form of opposed spaced abutments between which the spring is maintained under compression.

Since, as described in the objects, the spring is adjustable conveniently while the rider is seated on the saddle, the connecting element 14 connected to the sleeve 8 is secured thereto by means of a rod 15 which is securely fastened to the element 14. The rod 15 extends axially upwardly through the spring and through a suitable central aperture in the wall 12 and upwardly beyond the top of the collar 4 into the upper end of the carrier sleeve 8.

Mounted on the upper end of the rod 15 is a suitable cross bar 16. The carrier sleeve 8 is provided near its upper end with longitudinal slots 17 arranged diametrically opposite each other and the supporting sleeve 9 is provided with slots 18 arranged diametrically opposite from each other and aligned radially of the sleeve with the slots 17. The bar 16 extends through the aligned slots in the sleeves 8 and 9 and outwardly beyond the outer surface of the sleeve 8.

The upper end of the sleeve 8 is exteriorly threaded, as indicated at 19, and receives a complementarily threaded collar 20 which, upon rotation relative to the carrier sleeve 8, in opposite directions, travels lengthwise of the sleeve 8 in opposite directions to different adjusted positions. The collar 4 has a suitable annular channel 21 in which the ends of the bar 16 are received. For convenience in assembly, this channel may be provided by forming in the collar 4 a large diameter counterbore having a diameter greater than the length of the cross bar 16 so as to receive the bar 16 from the lower end of the collar. After insertion of the cross bar 16, the lower end of the counterbore may be closed by a suitable ring 22 which is welded to the collar 20 and forms a permanent part thereof.

The bar 16 fits in the channel 21 with operating clearance and the slots 17 and 18 are of such length as to permit the desired amount of adjustment of the coupling element 14 and at the same time permit the required amount of movement of the sleeve 9 in the sleeve 8 in all adjusted positions.

As is customary in saddle supporting posts of bicycles, the upper portion of the sleeve 9 may be upset to reduce the inside diameter and increase the rigidity and may be bent over at the desired angle to the generally upright portion of the sleeve to provide the usual horizontal saddle connecting portion 23.

The saddle may have any conventional connecting frame 24 with a clamp 25 thereon which is drawn tightly about the portion 23 for connecting the saddle connecting frame thereto. In the form illustrated the saddle 26 is pivotally connected at its forward end, as indicated at 27, to the saddle connecting frame 24 and the usual springs 28 are operatively interposed between the saddle connecting frame 24 and the saddle structure. The saddle may be installed on the forward supporting portion 23 of the sleeve 9 in any conventional manner.

As mentioned, the support described may be inserted in the usual bicycle frame socket and installed therein in the same manner as the conventional rigid saddle supporting post, care being taken that the lower ends of the slot 17 in the sleeve 8 are positioned somewhat above the top of the collar 4.

The rider then may mount the bicycle and operate it and while so doing adjust the tension of the spring 13 by manually rotating the collar 20 until the desired shock absorbing effect and resiliency for his particular weight or for the particular road surface is obtained.

Since the coacting thread faces of the collar 4 and sleeve 8 are held firmly seated against each other by the force of the spring 13, the collar 4 remains in its adjusted position under the usual conditions of operation but can be changed very readily by being grasped and rotated by hand.

Modifications may be made in the specific parts of the structure illustratively disclosed without departing from the scope of the invention.

Having thus described my invention, I claim:

1. In a bicycle frame and saddle supporting post combination, a bicycle frame having a generally upright tubular socket member for receiving and mounting a saddle support, a saddle supporting post member carried in said socket member and movable in opposite directions axially thereof, means constraining the members from relative rotation, a first connecting means carried by the socket member, cooperative connecting means carried by the post member, and spaced endwise of the socket member from a portion of the first connecting means, resilient means in the socket member operatively connected at its opposite ends to said connecting means, respectively, and thereby yieldably urging the saddle supporting post member outwardly endwise of the socket member, means operatively connecting the members for limiting said outward endwise movement of the post member, said first connecting means including an adjustment element accessible exteriorly of the members and of the bicycle frame for manipulation by hand and connected to the socket member for adjustment to different axial positions relative thereto, and connected to said portion of said first connecting means for moving said portion endwise of the members to different adjusted positions relative to the cooperative connecting means upon movement of the adjustment element to different adjusted positions for varying the stress of the resilient means.

2. The structure according to claim 1 characterized in that said cooperative connecting means comprises an abutment movable with the post member and said portion of the first connecting means is an abutment carried by the socket member through the medium of the adjustment element below the level of and spaced from the abutment on the post member, and said resilient means comprises a compression spring operatively interposed between said abutments.

3. The structure according to claim 1 characterized in that the socket member comprises a tubular member of the frame and a coaxial sleeve telescopically fitted into and detachably secured in adjusted position in the tubular member.

4. A saddle supporting device comprising a carrier sleeve adapted to be secured in generally upright position in a tubular bicycle frame member, a supporting sleeve telescopically interfitting with the carrier sleeve for movement endwise relative thereto and adapted to support a saddle, means constraining the sleeves from relative rotation, adjustment means carried by, and adjustable endwise of, one of the sleeves near its upper end and accessible from the outside of the sleeves for adjustment endwise thereof, a connecting means carried thereby for movement therewith endwise of the sleeves, complementary connecting means carried by the other sleeve and spaced endwise of the sleeves from the first connecting means, and resilient means operatively connected to the connecting means, respectively, and yieldably urging the sleeves apart endwise.

5. A saddle supporting device comprising an outer carrier sleeve adapted to be connected to a bicycle frame in upright position and having an elongated slot extending endwise thereof near its upper end, a saddle supporting sleeve telescopically mounted in the carrier sleeve for axial movement relative thereto lengthwise thereof and having an elongated slot aligned radially of the sleeves with the first slot for a portion of its length, an external collar coaxial with and embracing the carrier sleeve and in threaded engagement therewith for movement endwise thereof to different adjusted positions consequent upon rotation of the collar, an element in and movable endwise of the saddle supporting sleeve and having a portion extending through the slots outwardly beyond the said carrier sleeve and slidable endwise of the slots and connected to the collar for movement thereby endwise of the slots, connecting means connected to said element for movement therewith endwise of the sleeves, complementary connecting means on the inner end portion of the supporting sleeve and spaced from the first connecting means, resilient means operatively interposed between the connecting means, and thereby urging the supporting sleeve upwardly in the carrier sleeve, and cooperative means carried by the sleeves and constraining the sleeves from relative rotation.

6. A saddle supporting device comprising an outer carrier sleeve adapted to be connected to a bicycle frame in upright position and having an elongated slot in its upper portion extending endwise thereof, a saddle supporting sleeve telescopically mounted in the carrier sleeve for axial movement relative thereto lengthwise thereof and having an elongated slot aligned radially of the sleeves with the first slot for a portion of its length, an external collar coaxial with and embracing the carrier sleeve and in threaded engagement therewith for movement endwise thereof to different adjusted positions consequent upon rotation of the collar, an element in and movable endwise of the saddle supporting sleeve and having a portion extending into the slots and slidable endwise of the slots and connected to the collar for movement thereby endwise of the slots, said saddle supporting sleeve having a downwardly facing abutment movable therewith, a rod connected to said element and extending axially of the sleeves downwardly beyond the abutment of the saddle supporting sleeve, means on the lower end of the rod having an abutment facing toward the first abutment, a compression spring surrounding the rod and engaging said abutments and urging the saddle supporting sleeve upwardly, and means constraining the sleeves from relative rotation.

7. A saddle supporting device comprising an outer carrier sleeve adapted to be connected to a bicycle frame in upright position and having a slot at its upper portion extending endwise thereof, a saddle supporting sleeve telescopically mounted in the carrier sleeve for axial movement relative thereto lengthwise thereof and having a slot aligned radially of the sleeves with the first slot for a portion of its length, an adjustment member carried by the carrier sleeve and movable endwise thereof to different adjusted positions and accessible exteriorly thereof for movement by hand, means to secure the member in said different adjusted positions, an element in and movable endwise of the saddle supporting sleeve and operatively connected through the aligned slots to said member for movement thereby endwise of the sleeves, complementary means on the element and on the supporting sleeve, respectively, resilient means operatively connected to both connecting means and urging the connecting means to move relative to each other thereby to move the supporting sleeve upwardly in the carrier sleeve, and cooperative means carried by the sleeves and constraining them from relative rotation.

FRANZ v. SZILÁGYI.

References Cited in the file of this patent

FOREIGN PATENTS

| Number | Country | Date |
|--------|---------|------|
| 658,649 | France | June 6, 1929 |
| 96,335 | Germany | Sept. 2, 1896 |